United States Patent
Demarne et al.

(10) Patent No.: US 12,468,621 B2
(45) Date of Patent: *Nov. 11, 2025

(54) AUTOMATIC CORRECTNESS VALIDATION OF DATABASE MANAGEMENT SYSTEMS

(71) Applicant: Microsoft Technology Licensing, LLC, Redmond, WA (US)

(72) Inventors: Mathieu Baptiste Demarne, Seattle, WA (US); Timothy Underwood Johnson, La Mesa, CA (US); Miso Cilimdzic, Laguna Niguel, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 5 days.

This patent is subject to a terminal disclaimer.

(21) Appl. No.: 18/536,483

(22) Filed: Dec. 12, 2023

(65) Prior Publication Data
US 2024/0111657 A1    Apr. 4, 2024

Related U.S. Application Data

(63) Continuation of application No. 17/730,904, filed on Apr. 27, 2022, now Pat. No. 11,899,560.

(51) Int. Cl.
*G06F 11/3604* (2025.01)
*G06F 8/71* (2018.01)
*G06F 16/23* (2019.01)

(52) U.S. Cl.
CPC ........... *G06F 11/3612* (2013.01); *G06F 8/71* (2013.01); *G06F 16/2365* (2019.01)

(58) Field of Classification Search
CPC ..... G06F 8/71; G06F 11/3612; G06F 16/2365
See application file for complete search history.

(56) References Cited

U.S. PATENT DOCUMENTS

| | | | |
|---|---|---|---|
| 7,580,970 B2 * | 8/2009 | Bank | G06F 16/275 709/248 |
| 8,543,554 B1 * | 9/2013 | Singh | G06F 16/24552 707/706 |
| 8,887,026 B2 * | 11/2014 | Bremler-Barr | G06F 11/1064 714/773 |
| 9,075,897 B2 * | 7/2015 | Gao | G06F 18/24 |
| 9,122,716 B1 * | 9/2015 | Naganathan | G06F 16/2471 |
| 9,436,722 B1 * | 9/2016 | Bent | G06F 16/2365 |
| 10,013,443 B2 * | 7/2018 | Anderson | G06F 16/2365 |

(Continued)

*Primary Examiner* — Douglas M Slachta
(74) *Attorney, Agent, or Firm* — Weaver IP L.L.C.

(57) ABSTRACT

The automatic detection of inconsistencies in a database system is described. A first signature and a second signature are received. The first signature is a signature of a result of a first execution of the query against a database by a first version of database engine program code. The second signature is a signature of a result of a second execution of the query by a second version of the database engine program code. A determination is made of whether the first signature and the second signature match. In response to the first signature and the second signature failing to match, an inconsistency report regarding at least one of the first or second versions of the database engine program code is generated and remediation regarding at least one of the first or second versions of the database engine program code is performed.

20 Claims, 7 Drawing Sheets

(56) References Cited

U.S. PATENT DOCUMENTS

| | | | |
|---|---|---|---|
| 10,459,903 B2* | 10/2019 | Anderson | G06F 16/245 |
| 11,568,078 B2* | 1/2023 | Vandanapu | G06F 21/602 |
| 11,734,281 B1* | 8/2023 | Mac Manus | G06F 16/2255 |
| | | | 707/769 |
| 11,899,560 B2* | 2/2024 | Demarne | G06F 16/2365 |
| 2010/0332526 A1* | 12/2010 | Nori | G06F 16/213 |
| | | | 707/769 |
| 2011/0055221 A1* | 3/2011 | Sovio | G06F 16/9024 |
| | | | 707/747 |
| 2013/0191606 A1* | 7/2013 | Goldberg | G06F 11/2082 |
| | | | 711/E12.103 |
| 2016/0026648 A1* | 1/2016 | Ghosh | G06F 16/21 |
| | | | 707/690 |
| 2018/0060409 A1* | 3/2018 | Bhattacharya | G06F 16/2237 |
| 2018/0196842 A1* | 7/2018 | Maybee | G06F 11/328 |
| 2018/0285416 A1* | 10/2018 | Bestfleisch | G06F 16/24542 |
| 2020/0097587 A1* | 3/2020 | Klein | G06F 16/2462 |
| 2020/0104869 A1* | 4/2020 | Oh | G06Q 30/0629 |
| 2021/0075614 A1* | 3/2021 | Wang | H04L 9/3213 |
| 2021/0109917 A1* | 4/2021 | Xiao | G06F 16/2255 |
| 2022/0277010 A1* | 9/2022 | Zhou | G06F 16/24556 |

* cited by examiner

AUTOMATIC CORRECTNESS VALIDATION OF DATABASE MANAGEMENT SYSTEMS

CROSS-REFERENCE TO RELATED APPLICATIONS

This application is a continuation of U.S. patent application Ser. No. 17/730,904, filed Apr. 27, 2022, entitled "AUTOMATIC CORRECTNESS VALIDATION OF DATABASE MANAGEMENT SYSTEMS," which is incorporated herein by reference in its entirety.

BACKGROUND

When developing database system software, testing may be performed through validation tests during various stages of the software development. Typically, further validation is not performed once a new version of the database system is deployed to a user (e.g., a customer). In this context, if a problem within a database engine of the database system passes development testing undetected, a query processed by the database engine could generate incorrect results that are returned to a user without the software provider's or the user's knowledge.

BRIEF SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, and apparatuses are described for automatically detecting inconsistencies in a database system. A first signature and a second signature are received. The first signature is a signature of a result of a first execution of the query against a database by a first version of database engine program code. The second signature is a signature of a result of a second execution of the query by a second version of the database engine program code. A determination of whether the first signature and the second signature match is made. In response to the first signature and the second signature failing to match, an inconsistency report regarding at least one of the first or second versions of the database engine program code is generated and remediation regarding at least one of the first or second versions of the database engine program code is performed.

Further features and advantages of the embodiments, as well as the structure and operation of various embodiments, are described in detail below with reference to the accompanying drawings. It is noted that the claimed subject matter is not limited to the specific examples described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

Embodiments will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION

I. Introduction

Figure 1:
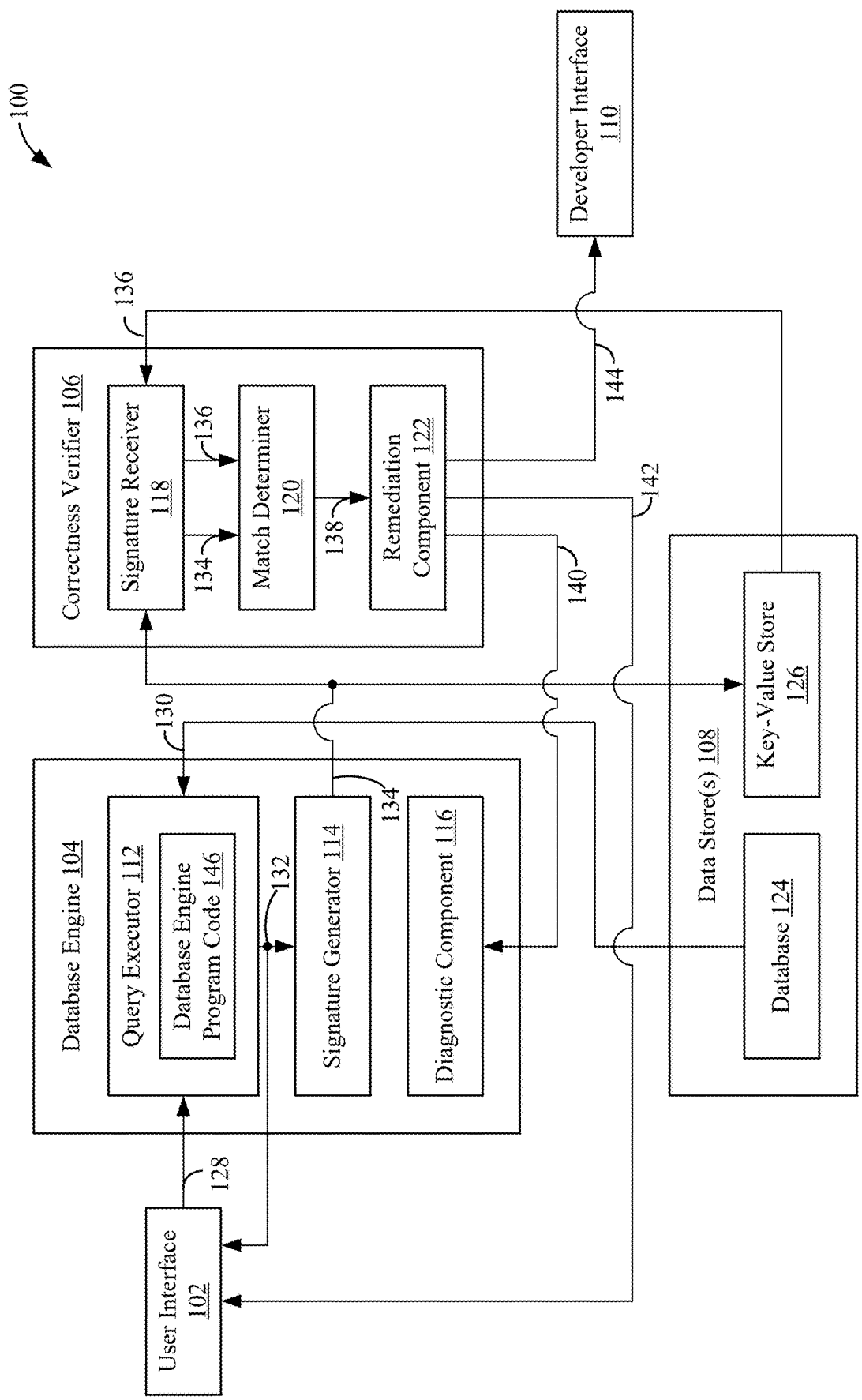
FIG. 1 is a block diagram of a system configured to automatically detect inconsistencies in a database system, according to an example embodiment.

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

If the performance of an operation is described herein as being "based on" one or more factors, it is to be understood that the performance of the operation may be based solely on such factor(s) or may be based on such factor(s) along with one or more additional factors. Thus, as used herein, the term "based on" should be understood to be equivalent to the term "based at least on."

Numerous exemplary embodiments are now described. Any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Systems and Methods for Automatically Detecting Inconsistencies

In database systems, validation testing is done to test the performance and functionalities of a database engine. Such validation tests may be performed during various stages of software development. For instance, a database management system (DBMS) may be tested for wrong results. Wrong results may lead to data corruption (e.g., materializing wrong results into a permanent table) that propagates onward in the data. In fast-paced deployment scenarios, such as cloud-provided services, quality checks on short deployment cycles may be implemented to test for inconsistencies in the DBMS.

As discussed in the Background section above, typically, further validation is not performed once a new version of the database system reaches users. In this context, if an issue within a database system passes testing undetected, the database engine of the database system may return incorrect results to a user without the software provider's or the customer's knowledge. Such code regression may impact a user environment in a non-negligible, negative manner.

Various techniques exist for testing the validity of a database system. For instance, traditional DBMS systems may be shipped infrequently, with validity testing being performed before releasing the system to users. The limited hardware resources and resource-constrained environments in these traditional DBMS systems limits the amount of overhead costs users are willing to tolerate. With the growth of data, the resource cost for executing complex queries in database systems has increased. For instance, online analytical processing (OLAP) systems are typically an order of magnitude larger than traditional online transactional processing (OLTP) systems, leading to increased system complexity.

Embodiments described herein automatically detect inconsistencies in a database system (e.g., a DBMS), overcoming the deficiencies of conventional techniques. In one implementation, a database engine is configured to receive and execute queries against a database to generate query results. The database engine generates a signature of a query result. The signature may be generated in any suitable form representative of the query result. For instance, a signature may be generated as a checksum of a query result, a count of rows of a query result, and/or another signature associated with the data streamed to the user, as described elsewhere herein or otherwise known. The query results may be returned in any suitable form, including as a matrix. In this context, the matrix columns represent the structure of data entries and are ordered based on schemas (e.g., specified as part of the query or as part of the database table schema). The matrix rows represent entries in the returned results (e.g., a returned dataset). Depending on the implementation, a query may or may not include a specific order function. For instance, two queries with the same identifier (e.g., matching query keys) may return results in different orders of rows across different executions.

In an embodiment, the aforementioned database engine generates the signature as a checksum of the result of an execution of the query using a per-row hash function. In accordance with an embodiment, the per-row hash function may be data-order agnostic. As an example, let $M_{X,Y}$ and $M'_{X,Y}$ be two matrices of the same results (e.g., the results of a first execution of a query and a second execution of a query). Each matrix has X columns and Y rows, but with differing row orders. In this example, the database engine generates a signature for $M_{X,Y}$ according to Equation 1 as follows:

$$H(M_{X,Y}) = \oplus_{i=1}^{i=|M_{X,Y}|} H'(M_{X,Y}(i)) \qquad \text{(Equation 1)}$$

In Equation 1, $H(M_{X,Y})$ is the signature generated for $M_{X,Y}$ and H' is a hash function over row i in $M_{X,Y}$. In this function, the XOR (exclusive OR) operator ($\oplus$) is commutative; therefore, $H(M_{X,Y})$ is equal to $H(M'_{X,Y})$, even if the orders of rows of the matrices differ. H' is a per-row hash function that may be based on any hash algorithm with a low collision probability, as would be understood by a person of skill in the relevant art(s) having benefit of this disclosure.

Note that the XOR operation is both commutative (as mentioned above with respect to Equation 1) and associative. In other words, regardless of the ordering of rows in query results, the signature of the query results generated according to Equation 1 is the same. The commutative and associative properties of the XOR operation are illustrated further according to Equation 2 as follows:

$$H'(M_{X,Y}(i)) \oplus H'(M_{X,Y}(j)) \oplus H'(M_{X,Y}(k)) \equiv \qquad \text{(Equation 2)}$$
$$[H'(M_{X,Y}(i)) \oplus H'(M_{X,Y}(j))] \oplus H'(M_{X,Y}(k)) \equiv$$
$$H'(M_{X,Y}(i)) \oplus [H'(M_{X,Y}(j)) \oplus H'(M_{X,Y}(k))]$$

In Equation 2, $H'(M_{X,Y}(i))$ is a hash function over row i of matrix $M_{X,Y}$, $H'(M_{X,Y}(j))$ is a hash function over row j of matrix $M_{X,Y}$, and $H'(M_{X,Y}(k))$ is a hash function over row k of matrix $M_{X,Y}$. As shown with regard to Equation 2 above, $H(M_{X,Y})$ of Equation 1 is the same regardless of the order that $H'(M_{X,Y}(i))$, $H'(M_{X,Y}(j))$, and $H'(M_{X,Y}(k))$ are evaluated by the XOR operation.

In an embodiment, the aforementioned database engine may generate signatures for query results in any manner, including storing query results from which signatures may be generated at a later time, transmitting query results to an external signature generator to generate the corresponding signatures, or generate signatures subsequent to returning the query results. In an embodiment, a database engine may generate the signature as results are returned (e.g., streamed) to a user. For instance, the database engine stores an accumulation of previous signatures and combines newly generated signatures using the XOR operation. In this way, the stored accumulation of signatures is a constant size (O(1)) while the computation is linear in the size of the dataset, $O(|M_{X,Y}|)$.

Once the aforementioned signature has been generated, it may be stored in a key-value store. The key-value store stores queries as keys and respective signatures as values, each stored query and signature pair forming a stored key-value. Each query key corresponds to an execution of a query at a respective timestamp (e.g., a query thumbprint at a respective timestamp). A query key ("key") may have various forms. For instance, in an embodiment, each query key is a tuple of (a) a query text hash corresponding to the execution of the query and (b) a joined hash of versions of objects used in the execution of the query at the respective timestamp. For instance, in an embodiment, the key-value store may be represented according to Equation 3 as follows:

$$(Q_t, \{i_t | i \in Q_t\}) \rightarrow H(M_{X,Y}(t)) \quad \text{(Equation 3)}$$

In Equation 3, $Q_t$ refers to a query key with timestamp t, $i_t$ is a unique identifier of an object i referred to at timestamp t by query $Q_t$, and $M_{X,Y}(t)$ is a matrix of size X×Y representing the result of the query $Q_t$ at time t. In embodiments, the key-value store may be cleaned using various methods, such as a least recently used (LRU) eviction method, query frequency ordering eviction mechanism, and/or other methods for another heuristic method for cleaning a key-value store, as described elsewhere herein or otherwise known.

As mentioned above, embodiments described herein automatically detect inconsistencies in a database system. For example, various correctness verification techniques described herein detect inconsistencies based on generated signatures of results of executions of queries. For instance, a correctness verifier may be configured to determine if a signature of a first execution of a query matches the signature of a second execution of the query. In this way, the correctness verifier automatically detects inconsistencies in the database system based on results of the first execution of the query and the second execution of the query. If the correctness verifier detects a mismatch, remediation may be performed based on the mismatch. For instance, the correctness verifier may: transmit a failure message to a user interface; transmit an inconsistency report to a developer interface; perform an assessment of database engine program code for an incorrect, non-deterministic issue; perform an automated enhanced diagnostic step (e.g., by transmitting a signal to the database engine to cause the database engine to capture a process image of the current state of the database engine for further analysis); and/or perform other remediations based on the detection of an inconsistency in the database system.

In an embodiment, correctness verifier uses signatures of results of executions of queries to automatically detect inconsistencies in a database system in a manner that increases inconsistency detection capability, reduces overhead, and enables specific query verification. Each of these aspects/benefits will now be briefly described.

Increased Inconsistency Detection Capability. The correctness verifier may be included in a database system deployed to a user or external to the database system. In either implementation, the correctness verifier is capable of detecting inconsistencies after a version of the database system is deployed.

Reduced Overhead. The signatures generated and stored for detecting inconsistencies are relatively small compared to query results. In an embodiment, a key-value store increases in size based on a number of distinct queries submitted to the database system, regardless of result set size. In this context, overhead per distinct query is reduced, enabling a key-value store to store more query keys and respective signatures for correctness verification, thereby increasing the correctness coverage of a correctness verifier.

Enabling Specific Query Verification. In certain implementations, a developer may specify a subset of queries to verify correctness for. For instance, in an embodiment, a developer may specify a correctness verifier to automatically detect inconsistencies in one or more of data manipulation language (DML) queries, SELECT queries, and/or any other subset of queries executed by the database engine. Through this capability, the memory footprint of the key-value store is relatively small.

In accordance with an embodiment, the aforementioned correctness verifier is configured to detect an inconsistency in deterministic queries. A deterministic query may be any query that is expected to return the same result when given the same input. Deterministic queries include queries that use certain built-in functions of a database engine (e.g., a ROUND query, a CEILING query, a DATALENGTH query, etc.), queries that are specified in a deterministic manner (e.g., a RAND query that specifies a particular seed), and/or any other deterministic query and/or query that is specified in a deterministic manner. In an embodiment, if signatures corresponding to two executions of the same query with the same version of a database engine program code fail to match, the correctness verifier performs an assessment of the same version of the database engine program code for incorrect, non-deterministic issues. For example, if a RAND query specifies a particular seed and the database engine fails to recognize the particular seed when executing the query, the first and second signatures may fail to match. In this context, the correctness verifier may generate an inconsistency report and perform remediation, as will be discussed with respect to embodiments of FIG. 1 further below.

Detection of inconsistencies in a database system may be implemented in various manners, in embodiments. For example, FIG. 1 is a block diagram of a system 100 that may be used to automatically detect inconsistencies in a database system, according to an example embodiment. Depending upon the implementation, system 100 may be implemented on a single computing device or across multiple computing devices. A non-limiting example of a computing device that may be used to implement system 100 is described below in reference to FIG. 8.

Figure 2:
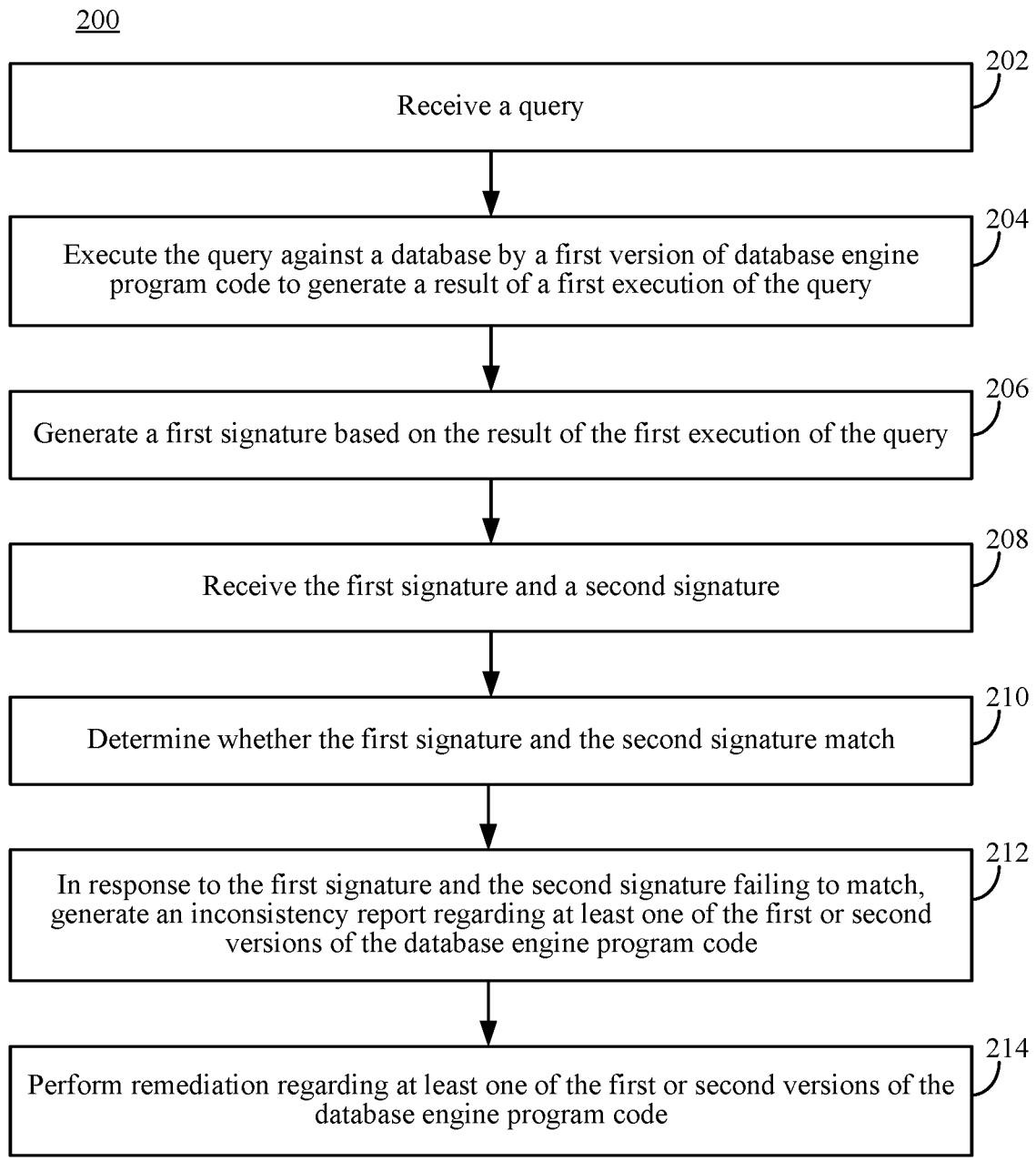
FIG. 2 is a flowchart of a process for automatically detecting inconsistencies in a database system, according to an example embodiment.

As shown in FIG. 1, system 100 includes a user interface 102, a database engine 104, a correctness verifier 106, one or more data stores 108 ("data stores 108" hereinafter), and a developer interface 110. Database engine 104 includes a query executor 112, a signature generator 114, and a diagnostic component 116. Query executor 112 includes database engine program code 146. Correctness verifier 106 includes a signature receiver 118, a match determiner 120, and a remediation component 122. Database engine 104 and correctness verifier 106 are configured to access data stores 108. Data stores 108 may include a database 124, a key-value store 126, and/or any other database/query/signature information described herein. Depending on the implementation, any of user interface 102, database engine 104, correctness verifier 106, data stores 108, and/or developer interface 110 may be implemented by the same computing device. Alternatively, any of the components of system 100 may communicate with each other over a network, (e.g., one or more wired networks, one or more wireless networks, and/or a combination of wired and wireless networks). For illustrative purposes, system 100 is described below with respect to FIG. 2. FIG. 2 is a flowchart 200 of a process for automatically detecting inconsistencies in a database system, according to an example embodiment. System 100 may operate according to flowchart 200 in embodiments. Note that not all steps of flowchart 200 need be performed in all embodiments. Further structural and operational embodiments will be apparent to persons skilled in the relevant art(s) based on the following description of FIGS. 1 and 2.

Flowchart 200 of FIG. 2 begins with step 202. In step 202, a query is received. For example, as shown in FIG. 1, query executor 112 is configured to receive a query 128 (e.g., from user interface 102). Query 128 may be any type of query (e.g., an SQL (Structured Query Language) query, a DML query) and may include one or more of any suitable statements and related clauses (e.g., a SELECT statement, a WHERE clause, etc.) and may specify a subset of data of database 124. For instance, as shown in FIG. 1 and as further discussed with respect to step 204 below, query executor 112 may obtain subset of data 130 from database 124 in response to query 128.

In step 204, the query is executed against a database by a first version of database engine program code to generate a result of a first execution of the query. In an embodiment, query executor 112 executes query 128 against database 124 by database engine program code 146 to generate result 132. In an embodiment, database engine program code 146 is a first version of the program code of database engine 104. The first version of the program code of database engine 104 may be a current version of the program code of database engine 104, a version of the program code of database engine 104 at a timestamp, a copy of the program code of database engine 104, and/or any other type of version of the program code of database engine 104. Note database engine 104 may be database engine configured to create, read, update, and/or delete data from a database using queries formulated according to any database query language mentioned herein or otherwise known. In response to executing query 128, query executor 112 may obtain data (e.g., subset of data 130) from database 124. Once query executor 112 generates result 132, database engine 104 may transmit (e.g., stream) result 132 to user interface 102. Depending on the implementation, database engine 104 may store result 132 in a memory or other storage device. For instance, in a result set caching implementation, database engine 104 stores result 132 in a result set cache, not shown in FIG. 1 for brevity.

In step 206, a first signature is generated based on the result of the first execution of the query. For example, signature generator 114 generates first signature 134 based on result 132. In an embodiment, signature generator 114 generates first signature 134 according to Equation 1 or other suitable signature generation technique, including a checksum generation technique, etc. Depending on the implementation, signature generator 114 may transmit first signature 134 to a correctness verifier internal to the computing device implementing database engine 104 (e.g., correctness verifier 106), transmit first signature 134 to an external correctness verifier, store first signature 134 in a log (e.g., as telemetric data), and/or store a query key corresponding to query 128 as a key with a respective value representative of first signature 134 in key-value store 126.

In step 208, a first signature and a second signature are received. For example, as shown in FIG. 1, signature receiver 118 of correctness verifier 106 receives first signature 134 from signature generator 114 and a second signature 136 from key-value store 126. In an embodiment, second signature 136 is a signature of a result of a second execution of query 128 by a second version of database engine program code 146. The second version of database engine program code 146 may be the current version of database engine program code 146, a previous version of database engine program code 146, a version of database engine program code 146 at a particular timestamp, a copy of database engine program code 146, and/or any other type of version of database engine program code 146. In an embodiment, the first and second versions of database engine program code 146 are different versions of database engine program code 146. Alternatively, the first and/or second versions of database engine program code 146 are different copies of database engine program code 146. In a particular embodiment, the first and second versions of database engine program code 146 are a same version of database engine program code 146. Signature receiver 118 may retrieve second signature 136 based on first signature 134. For instance, as will be discussed below with respect to FIGS. 5 and 6, signature receiver 118 may access key-value store 126 to receive second signature 136.

In step 210, a determination is made of whether the first signature and the second signature match. In embodiments, match determiner 120 of FIG. 1 is configured to determine whether first signature 134 and second signature 136 match. For instance, an embodiment of match determiner 120 determines whether first signature 134 and second signature 136 match according to Equation 4 as follows:

$$Q_t = Q_{t'} \wedge \{i_t | i \in Q_t\} = \{i_{t'} | i \in Q_{t'}\} \wedge H(M_{X,Y}(t)) = H(M_{X,Y}(t'))$$ (Equation 4)

In Equation 4, t and t' represent timestamps of executions of query 128 (e.g., the execution of query 128 in step 204 and the execution of query 128 by a second version of database engine program code 146). In embodiments, if match determiner 120 determines a mismatch between $H(M_{X,Y}(t))$ and $H(M_{X,Y}(t'))$, match determiner 120 generates mismatch indication 138 and flowchart 200 proceeds to step 212. In an accordance with an embodiment, if match determiner 120 determines $H(M_{X,Y}(t))$ and $H(M_{X,Y}(t'))$ match, no inconsistency is detected. Depending on the implementation, system 100 may continue operations of system 100, generate a report to be transmitted to developer interface 110 indicating no inconsistency was detected, recompute results 132 by repeating the execution of query 128 for additional verification by correctness verifier 106, and/or otherwise perform operations associated with system 100, as described elsewhere herein and/or as would be understood by a person of skill in the relevant art(s) having benefit of this disclosure.

In step 212, in response to the first signature and the second signature failing to match, an inconsistency report regarding at least one of the first or second versions of the database engine program code is generated. For example, as shown in FIG. 1, remediation component 122 of FIG. 1 receives mismatch indication 138. In response to mismatch indication 138 indicating that first signature 134 and second signature 136 fail to match, remediation component 122 generates an inconsistency report that provides information related to the match failure. For instance, the inconsistency report may indicate information regarding one or more of: the first and/or second versions of database engine program code 146, the execution of query 128 performed in step 204 and/or performed by the second version of database engine program code 146, result 132, first signature 134, second signature 136, and/or other information associated with the operation of system 100. Note that the first and second versions of the database engine program code may be the same versions or different versions of the database engine program code.

In step 214, remediation regarding at least one of the first or second versions of the database engine program code is performed. In embodiments, in response to mismatch indication 138 indicating first signature 134 and second signature 136 fail to match, remediation component 122 of FIG. 1 performs remediation regarding at least one of the first and/or second versions of database engine program code 146. For example, as shown in FIG. 1, remediation component 122 transmits a signal 140 to diagnostic component 116 of database engine 104 to cause database engine 104 to capture a process image of the current state of database engine 104, transmits a failure message 142 to user interface 102, and/or transmits a development message 144 that contains the inconsistency report to developer interface 110.

Thus, embodiments for the automatic detecting of inconsistencies in a database system are described above with respect to system 100 of FIG. 1 and flowchart 200 of FIG. 2. In embodiments, correctness verifier 106 may be deployed with database engine 104 (e.g., as part of a database system executing on a computing device) or deployed external to database engine 104. In an embodiment, a correctness verifier external to database engine 104 is configured to automatically detect inconsistencies in system 100 based on telemetry logged by database engine 104. In this context, the correctness verifier may periodically access logged telemetry to determine if there is a mismatch between signatures (e.g., first signature 134 and second signature 136) of results of queries with matching query keys.

In embodiments, user interface 102 and/or developer interface 110 may be any type of interface suitable for a user and/or a developer to interact with system 100. For instance, user interface 102 and developer interface 110 may include any number of graphic user interfaces (GUI) or text-based interfaces. For example, user interface 102 may be a GUI configured to enable a user to submit queries (e.g., query 128) to database engine 104. Developer interface 110 may be a GUI configured to enable a developer to receive development message 144, view inconsistency report 138, and/or deploy database engine program code 146. For instance, a developer may deploy an update to database engine program code 146 via developer interface 110. In some embodiments, failure message 140 is communicated to a user and/or development message 144 is communicated to a developer via any of a variety of notification mediums (e.g., e-mail messages, text messages, mobile device notifications, application notifications, and/or computer device notifications), either in addition to or in place of user interface 102 and/or developer interface 110.

III. Example Database Engine Embodiments

Database engines such as database engine 104 may execute queries and generate signatures in various ways. For instance, in implementations with result set caching capabilities, repeated queries are not typically recomputed. In such implementations, a result set caching technique may detect that query 128 has been previously computed and the results were cached, obtain the cached results, and transmit (e.g., stream) the cached results back to the user without having to recompute query 128. However, in such implementations, database engine 104 may be configured to recompute results and signatures for a subset of repeated queries (e.g., based on query type, computation resource requirements, random selection, and/or another factor for selecting a subset of queries) even if underlying data has not changed. In this context, either the cached results or the recomputed results may be streamed to the user. For example, the cached results may be streamed to the user while database engine 104 executes the query to generate the recomputed results. In this context, correctness verifier 106 receives first signature 134 corresponding to the recomputed results and second signature 136 corresponding to the cached results and determines if first signature 134 and second signature 136 match, as described elsewhere herein.

Figure 3:
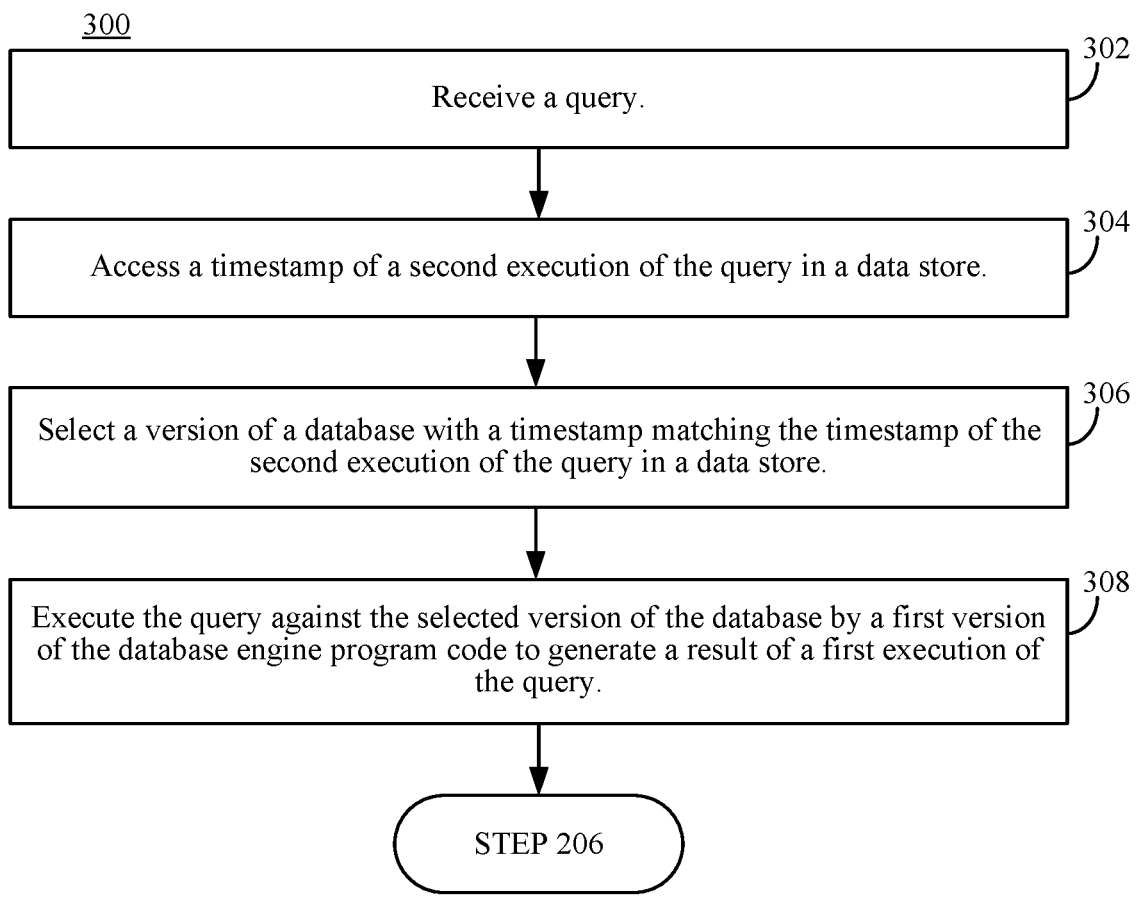
FIG. 3 is a flowchart of a process for generating a first signature, according to an example embodiment.
Figure 4:
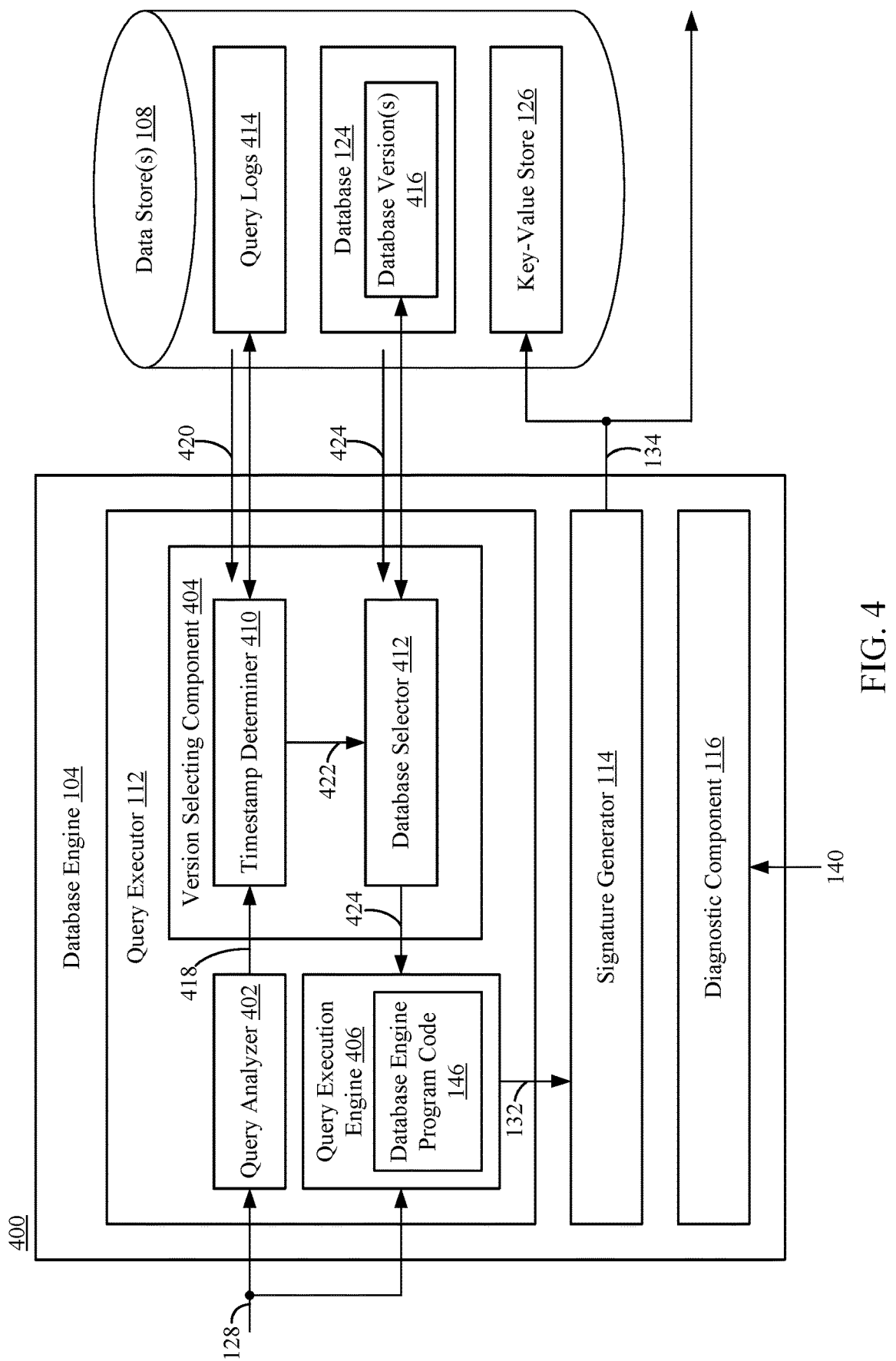
FIG. 4 is a block diagram of the database engine of FIG. 1, according to an example embodiment.

In another example, database engine 104 may be configured to execute query 128 against a previous version of database 124. For instance, FIG. 3 is a flowchart 300 of a process for generating a first signature, according to an example embodiment. Database engine 104 may operate according to flowchart 300 in embodiments. For illustrative purposes, flowchart 300 is described below with respect to FIG. 4. FIG. 4 is a block diagram of database engine 104 of FIG. 1, according to an example embodiment. As shown in FIG. 4, database engine 104 includes query executor 112, signature generator 114, and diagnostic component 116. Furthermore, query executor 112 includes a query analyzer 402, a version selection component 404, and a query execution engine 406. Version selection component 404 includes a timestamp determiner 410 and a database selector 412. Query execution engine 406 includes database engine program code 146. As shown in FIG. 4, database engine 104 is configured to access data stores 108. Data stores 108 includes query logs 414, database 124, and key-value store 126. Furthermore, database 124 includes one or more database version(s) 416 ("database versions 416" hereinafter). Further structural and operational embodiments will be apparent to persons skilled in the relevant art(s) based on the following descriptions of FIGS. 3 and 4.

Flowchart 300 begins with step 302, which is a further embodiment of step 202 of FIG. 2. In step 302, a query is received. For example, query analyzer 402 and query execution engine 406 of FIG. 4 receive query 128 (e.g., from user interface 102 of FIG. 1). In an embodiment, query analyzer 402 analyzes query 128 to generate a query key 418 representative of query 128 (e.g., $Q_{(t)}$ of Equation 4). Query key 418 may have various forms, including any mentioned elsewhere herein or otherwise known.

In step 304, a timestamp of a second execution of the query is accessed in a data store. For example, timestamp determiner 410 of FIG. 4 accesses a timestamp of a second execution of query 128 in query logs 414 of data stores 108. In embodiments, second execution of query 128 is an execution of query 128 against a previous version of database 124 by a second version of database engine program code 146. In an embodiment, timestamp determiner 410 accesses the timestamp of the second execution of query 128 by matching query key 418 against query keys logged in query logs 414 to obtain a query key 420 corresponding to the second execution of query 128. In this embodiment, timestamp determiner 410 determines timestamp 422 from query key 420.

In step 306, a version of a database with a timestamp matching the timestamp of the second execution of the query is selected in a data store. For example, database selector 412 of FIG. 4 selects a version 424 of database 124 from data stores 108, version 424 having a timestamp that matches timestamp 422. In embodiments, version 424 may have a timestamp that exactly matches timestamp 422 or may have a timestamp prior to timestamp 422. For instance, the timestamp of version 424 may indicate the last time database 124 was generated, modified, updated, or otherwise changed before the second execution of query 128.

Step 308 may be a further embodiment of step 204 of FIG. 2. In step 308, the query is executed against the selected version of the database by a first version of the database engine program code to generate a result of a first execution of the query. For example, query execution engine 406 executes query 128 against version 424 by database engine program code 146 to generate result 132. Once result 132 is generated, flowchart 300 proceeds to step 206 of flowchart 200, as described above with respect to FIG. 2.

IV. Example Correctness Verifier Embodiments

Figure 5:
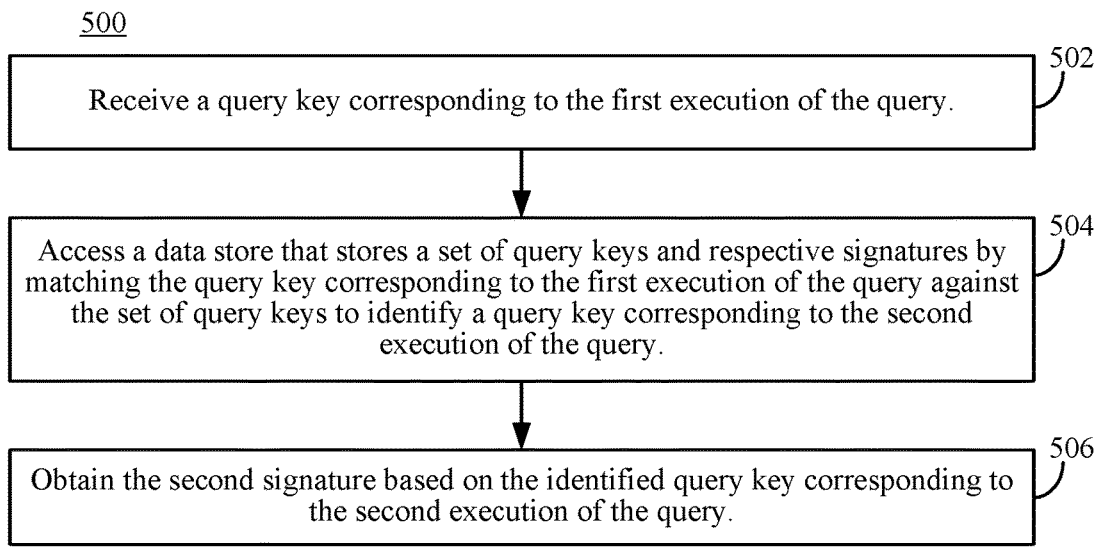
FIG. 5 is a flowchart of a process for obtaining a second signature, according to an example embodiment.
Figure 6:
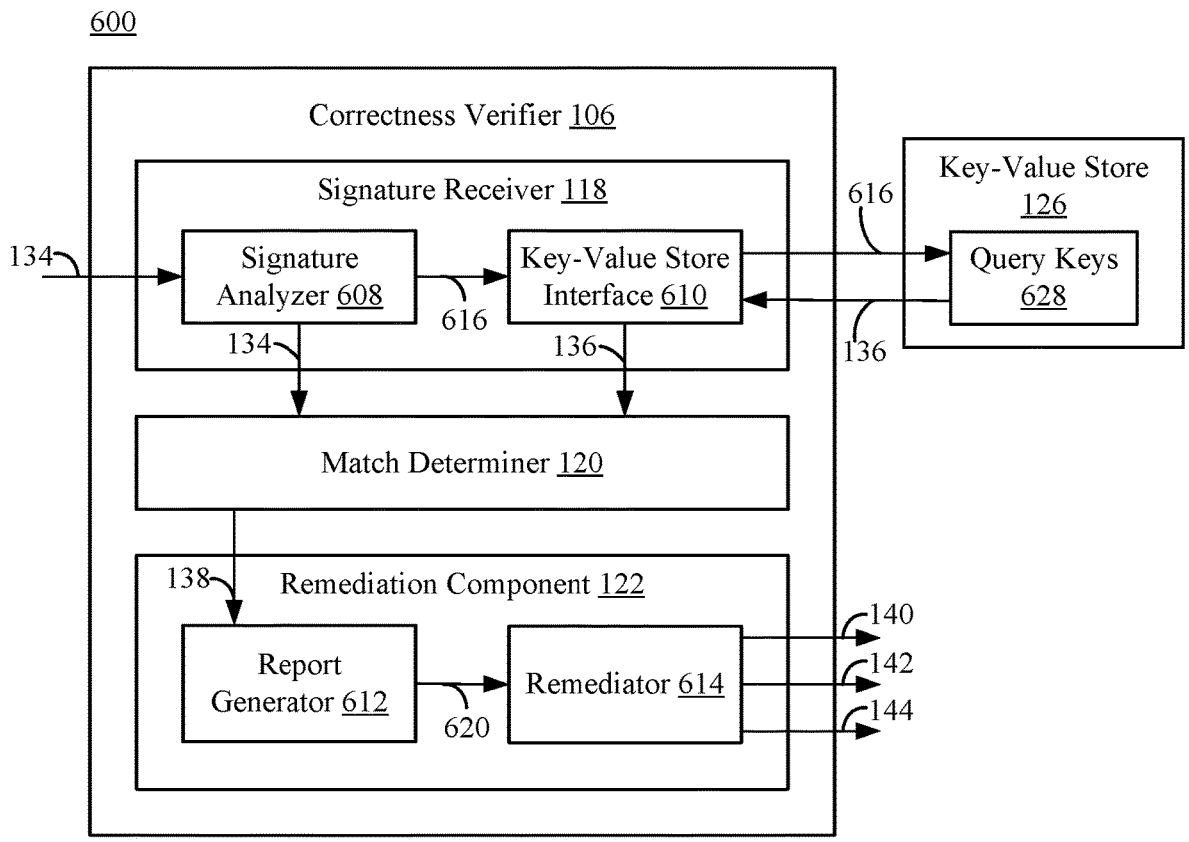
FIG. 6 is a block diagram of the correctness verifier of FIG. 1, according to an example embodiment.

In embodiments, correctness verifier 106 may be configured in various ways to receive first signature 134 and second signature 136, and may operate in various ways. For instance, FIG. 5 is a flowchart 500 of a process for obtaining a second signature for comparison against a first signature, according to an example embodiment. For instance, flowchart 500 may be performed to retrieve the second signature of step 208 of flowchart 200 (FIG. 2). Correctness verifier 106 may operate according to flowchart 500 in embodiments. For illustrative purposes, flowchart 500 is described below with respect to FIG. 6. FIG. 6 is a block diagram of correctness verifier 106 of FIG. 1, according to an example embodiment. As shown in FIG. 6, correctness verifier 106 includes signature receiver 118, match determiner 120, and remediation component 122. Furthermore, signature receiver 118 includes a signature analyzer 608 and a key-value store interface 610, remediation component 122 includes a report generator 612 and a remediator 614, and key-value store 126 includes a set of query keys 628. Further structural and operational embodiments will be apparent to persons skilled in the relevant art(s) based on the following descriptions of FIGS. 5 and 6.

Flowchart 500 begins with step 502. In step 502, a query key corresponding to the first execution of a query is received. In an embodiment, signature analyzer 608 receives and analyzes first signature 134 to identify a query key 616. For instance, query key 616 may be received by signature analyzer 608 alongside, separate from, or as part of first signature 134. Alternatively, signature analyzer 608 may obtain query key 616 from key-value store 126 based on first signature 134. Query key 616 corresponds to the execution of query 128 (e.g., as performed in step 204 of flowchart 200 of FIG. 2). As shown in FIG. 6, key-value store interface 610 receives query key 616 from signature analyzer 608.

In step 504, a data store that stores a set of query keys and respective signatures is accessed by matching the query key corresponding to the first execution of the query against the set of query keys to identify a query key corresponding to the second execution of the query. For example, key-value store interface 610 of FIG. 6 accesses key-value store 126 by matching query key 616 against set of query keys 628 to identify a query key corresponding to the second execution of query 128. In an embodiment, key-value store identifies the query key corresponding to the second execution of query 128 according to Equation 5 as follows:

$$Q_t = Q_{t'} \land \{i_t \in Q_t\} = \{i_{t'} | i \in Q_{t'}\} \quad \text{(Equation 5)}$$

In Equation 5, $Q_t$ is query key 616 at timestamp t, $Q_{t'}$ is a query key corresponding to the second execution of query 128 at timestamp t', $i_t$ is a unique identifier of an object i referred to at timestamp t by the first execution of query 128, and $i_{t'}$ is a unique identifier of object i referred to at timestamp t' by the second execution of query 128.

In step 506, the second signature is obtained based on the identified query key corresponding to the second execution of the query. For example, key-value store interface 610 obtains second signature 136 from key-value store 126 as paired with the query key identified in step 504.

Once second signature 136 is obtained, flowchart 500 ends and the operation of correctness verifier 106 proceeds as described elsewhere herein. For instance, the operation of correctness verifier 106 may proceed to step 210 of flowchart 200 as described above with respect to FIG. 2. For example, in response to first signature 134 and second signature 136 failing to match (e.g., as indicated by mismatch indication 138), report generator 612 is configured to generate an inconsistency report 620 regarding at least one of the first or second versions of database engine program code 146. Furthermore, remediator 614 is configured to perform remediation (e.g., transmit signal 140, transmit failure message 142, and/or transmit development message 144) regarding at least one of the first or second versions of database engine program code (e.g., based at least on inconsistency report 620).

V. Example Detection of Inconsistencies in a Database System

Figure 7A:
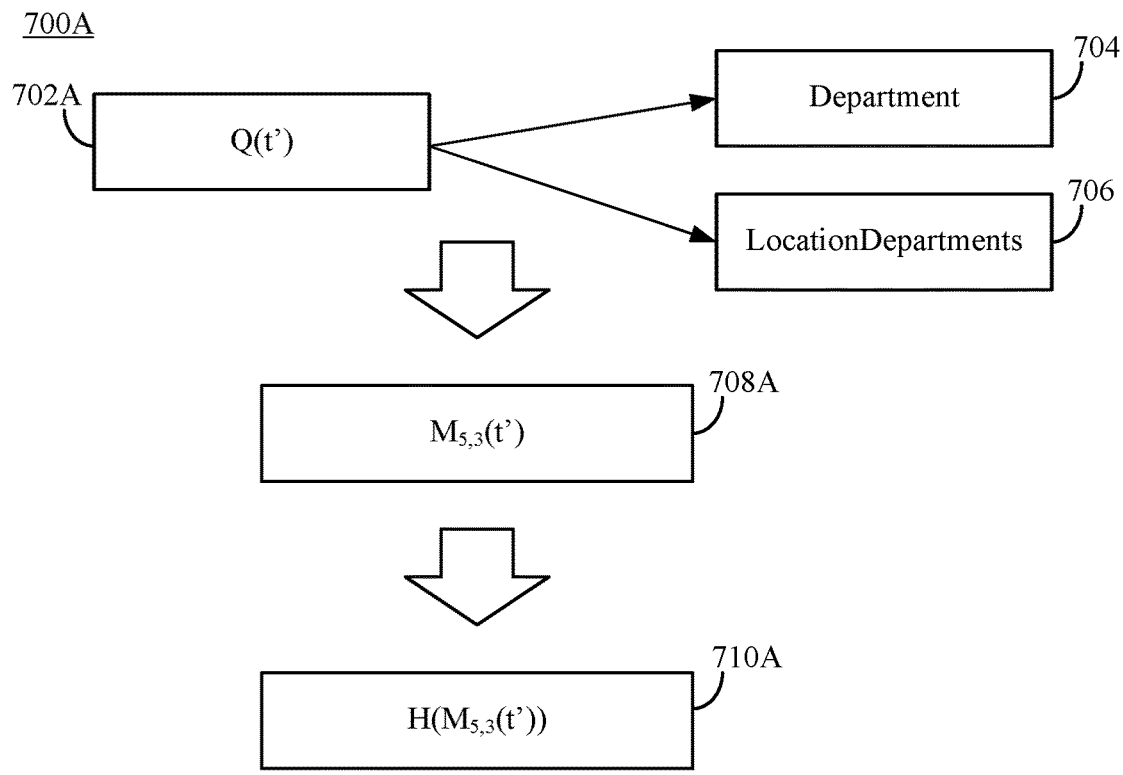
FIG. 7A illustrates an example operation for executing a query and generating a signature that may be performed by the database engine of FIG. 1, according to an example embodiment.
Figure 7B:
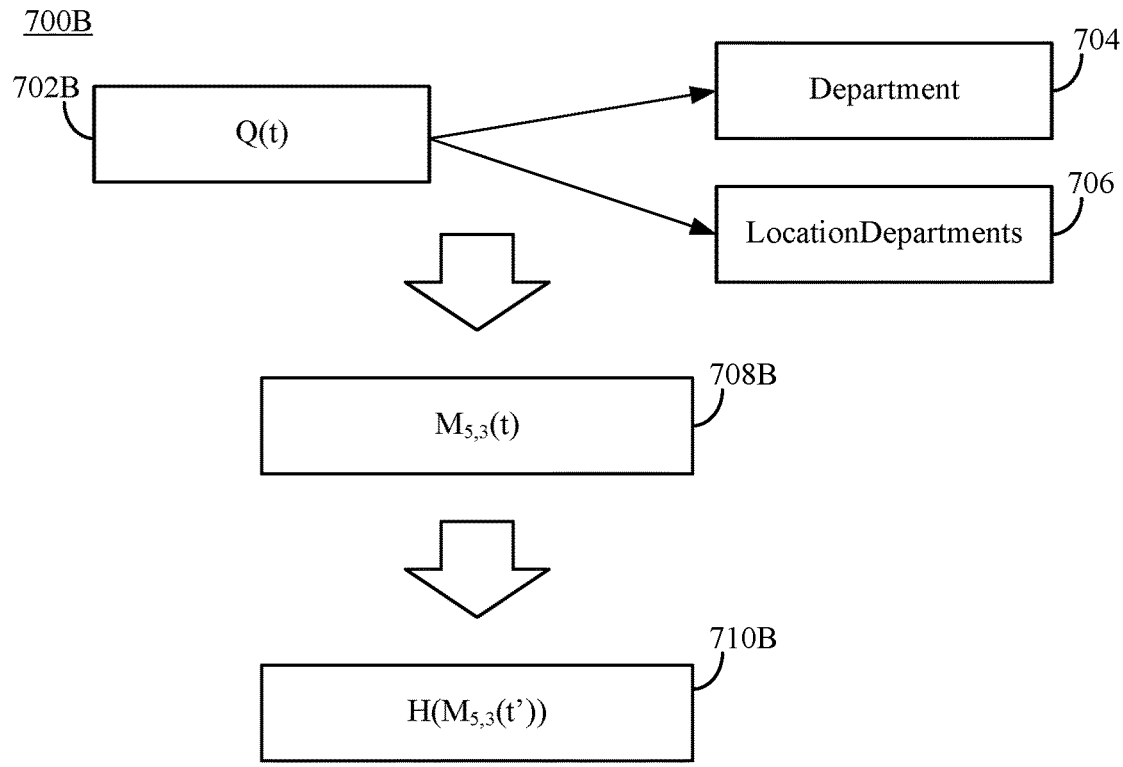
FIG. 7B illustrates another example operation for executing a query and generating a signature that may be performed by the database engine of FIG. 1, according to an example embodiment.

In embodiments, inconsistencies in database engine program code 146 may be automatically detected based on the comparison of query results generated by different versions of database engine program code 146. An example automatic detection of such inconsistencies is described with respect to FIG. 7A and FIG. 7B. FIGS. 7A and 7B respectively illustrate the execution of a same query against first and second versions of a database engine, which can be used to detect a problem with at least one of the database engine versions. FIGS. 7A and 7B are described in detail as follows.

In particular, FIG. 7A illustrates an example operation 700A for executing a query and generating a signature ("operation 700A" hereinafter) that may be performed by database engine 104 of FIG. 1, according to an embodiment. Operation 700A is described below with continued reference to system 100 of FIG. 1.

As shown in FIG. 7A, operation 700A includes a query key 702A labeled "Q(t)", a department table 704 labeled "Department", a department location table 706 labeled "LocationDepartments", results 708A labeled "$M_{5,3}(t)$", and a signature 710A labeled "$H(M_{5,3}(t))$". Query key 702A represents the query text of query Q executed against a first version of database engine program code 146. In particular, query key 702A represents the query text of a query Q executed against database 124 by database engine program code 146 at timestamp t and the versions of objects referenced by query Q at timestamp t. In embodiments, query key 702A may represent the execution of query Q by a current version, a previous version, an original version, or a copied version of database engine program code 146.

Query Q may include one or more of any query statements or any suitable query language. An example of query Q that joins tables 704 and 706 is shown below:

---

Query Q

---

SELECT
    [Department].DeptName
    , [Department].DeptHead
    , [Department].DeptHeadcount
    , [LocationDepartments].LocName
    , [LocationDepartments].City
FROM [dbo].[Department]
LEFT JOIN [dbo].[LocationDepartments]
    ON [Department]. DeptID = [LocationDepartments].DeptID;

---

In this example, query Q references department table 704 ("Department") and department location table 706 ("LocationDepartments"). Tables 704 and 706 may contain any number of rows and columns, as well as any type and amount of data. Continuing the above illustration, examples of department table 704 and department location table 706 are shown below:

Department Table 704 - "Department"

| DeptID | DeptName | DeptHead | DeptHeadcount |
|---|---|---|---|
| DeptA | Department A | DeptHead A | 25 |
| DeptB | Department B | DeptHead B | 45 |
| DeptC | Department C | DeptHead C | 32 |

Department Location Table 706 - "LocationDepartments"

| DeptID | LocID | LocName | City |
|---|---|---|---|
| DeptA | LocA | Location A | City A |
| DeptB | LocB | Location B | City B |
| DeptC | LocC | Location C | City C |

In an embodiment, query executor 112 of FIG. 1 executes query Q against department table 704 and department location table 706 by database engine program code 146 to generate results 708A. In an embodiment, results 708A are represented by Matrix 1 as follows:

$$M_{5,3}(t) = \begin{bmatrix} \text{Department } A & \text{DeptHead } A & 25 & \text{Location } A & \text{City } A \\ \text{Department } B & \text{DeptHead } B & 45 & \text{Location } B & \text{City } B \\ \text{Department } C & \text{DeptHead } C & 32 & \text{Location } C & \text{City } C \end{bmatrix} \quad \text{(Matrix 1)}$$

In this example, signature generator 114 of FIG. 1 is configured to generate signature 710A based on Matrix 1. For instance, signature generator 114 may generate signature 710A as a checksum of Matrix 1 (e.g., according to Equation 1). Signature generator 114 may store these instances of query key 702A and signature 710A in key-value store 126 as a key (query key 702A) and corresponding value (signature 710A).

FIG. 7B illustrates an example operation 700B for executing a query and generating a signature ("operation 700B" hereinafter) that may be performed by database engine 104 of FIG. 1, according to an embodiment. In an embodiment, operation 700B is performed by a version of database engine 104 that is different than the version of database engine 104 that performed operation 700A of FIG. 7A. Operation 700B is described below with continued reference to system 100 of FIG. 1 and operation 700A of FIG. 7A.

As shown in FIG. 7B, operation 700B includes a query key 702B labeled "Q(t')", department table 704, department location table 706, results 708B labeled "$M_{5,3}(t')$", and a signature 710B labeled "$H(M_{5,3}(t'))$". Query key 702B is executed against a second version of database engine program code 146, which is a different version than the first version of database engine program code 146 that query key 702A of FIG. 7A is executed against. In particular, query key 702B represents the query text of query Q executed against database 124 by database engine program code 146 at timestamp t' and the versions of objects referenced by query Q at timestamp t'. In embodiments, query key 702B may represent the execution of query Q against a second version of database engine program code 146 by an updated, copied, current, and/or previous version of database engine program code 146.

As shown in FIG. 7B, query key 702B references department table 704 and department location table 706. In an embodiment, query executor 112 of FIG. 1 executes query Q against department table 704 and department location table 706 by database engine program code 146 to generate results 708B. In an embodiment, results 708B are represented by Matrix 2 as follows:

$$M_{5,3}(t') = \begin{bmatrix} \text{Department } A & \text{DeptHead } A & 25 & \text{City } A & \text{City } A \\ \text{Department } B & \text{DeptHead } B & 45 & \text{City } B & \text{City } B \\ \text{Department } C & \text{DeptHead } C & 32 & \text{City } C & \text{City } C \end{bmatrix} \quad \text{(Matrix 2)}$$

In Matrix 2, data in the "City" column of department location table 706 is returned in column 4 instead of data in the "LocName" column. This incorrect generation of output data is due to incorrect program code in the second version of database engine program code 146. For example, the error may be due to database engine program code 146 incorrectly accessing or storing data in database 124, incorrectly executing the "SELECT . . . [LocationDepartments].LocName" subquery of query Q, and/or incorrectly executing query Q in another manner at timestamp t'.

Continuing the above example, signature generator 114 of FIG. 1 generates signature 710B based on Matrix 2. In an embodiment, signature generator 114 generates signature 710B as a checksum of Matrix 2 (e.g., according to Equation 1). Signature generator 114 may store query key 702B and signature 710B in key-value store 126 as a key and corresponding value and/or may transmit signature 710B to correctness verifier 106.

As described herein, correctness verifier 106 of FIG. 1 is configured to automatically detect inconsistencies in system 100. Continuing the above example, signature receiver 118 of correctness verifier receives signature 710A (e.g., a first signature of a result of a first execution of a query against a database by a first version of database engine program code) and signature 710B (e.g., a second signature of a result of a second execution of a query against a database by a second version of database engine program code) as described above. Match determiner 120 determines that signatures 710A and 710B fail to match by performing a comparison of signatures 710A and 710B in any manner (e.g., according to Equation 4 above). In other words, $H(M_{5,3}(t)) \neq H(M_{5,3}(t'))$. In response to signatures 710A and 710B failing to match, mismatch indication 138 is generated to indicate the mismatch. Remediation component 122 receives mismatch indication 138, and in response generates an inconsistency report regarding the version of database engine program code 146 that performed operation 700B (e.g., the second version) and/or the version of database engine program code 146 that performed operation 700A (e.g., the first version).

For instance, continuing the example of FIGS. 7A and 7B, if the first version of database engine program code 146 was previously verified as operating correctly (e.g., by having its query results compared in the manner of flowchart 200 to query results generated by a prior version of database engine program code 146, resulting in a match), remediation component 122 may assume that an inconsistency between the query results generated by the first and second versions of database engine program code 146 means that a problem (e.g., code error) is present in the second version of database engine program code 146. As such, the inconsistency report generated by remediation component 122 indicates a problem exists in the second version of database engine program code 146. In an implementation, remediation component 122 may be configured to list in the inconsistency report the particular data in the query results generated by the second version of database engine program code 146 that does not match the corresponding data in the query results generated by the first version of database engine program code 146.

As described elsewhere herein, remediation component 122 may additionally or alternatively perform remediation regarding at least one of the versions of database engine program code 146. For example, in response to determining a problem in the second version of database engine program code 146, remediation component 122 may cause one or more deployed instances of the second version of database engine program code 146 to be reverted back to (e.g., replaced with) the first version of database engine program code 146, in the case where the first version of database engine program code 146 has not had problems (e.g., has operated consistent with prior versions of database engine program code 146).

VI. Further Example Embodiments and Advantages

As noted above, systems and devices may be configured in various ways for automatically detecting inconsistencies in a database system. Example embodiments have been described with respect to detecting inconsistencies in first and second versions of database engine program code; however, it is also contemplated herein that inconsistencies may be detected in the same version of database engine program code. For instance, if the first and second versions of the database engine program code are the same version of the database engine program code and the first signature and the second signature fail to match, the inconsistency report may indicate an incorrect, non-deterministic issue exists in the database engine. In this context, a correctness verifier may perform an assessment of the same version of the database engine program code for an incorrect, non-deterministic issue as at least a portion of remediation. For example, a correctness verifier in accordance with an embodiment may perform an assessment of the database engine program code (the same version) by capturing a process image of the current state of the database engine for further analysis and/or transmitting an alert (e.g., a failure message or the inconsistency report) to a developer interface and/or a user interface.

In another embodiment, a database system may generate a copied instance of a database engine to execute queries, such as when a developer enters a copy command in a developer interface. It is possible the copied instance of the database engine may be different than the version from which the copy is made due to an error in the copying process. The developer may execute queries against the copied instance of the database engine using the developer interface. Alternatively, the developer may configure the copied instance of the database engine to automatically select and execute queries (e.g., for a period of time or a number of queries). The queries may be queries similar to queries submitted by a user, queries previously submitted by users, and/or queries designated by the developer. Depending on the implementation, the copied instance of the database engine may execute queries against a first version and/or a second version of the database. By generating a copied instance of the database engine, a correctness verifier may automatically detect inconsistencies before a user submits the same query, automatically detect inconsistencies before a new or different version of the database engine is used by a user, automatically detect inconsistencies in addition to inconsistencies detected based on an operation described elsewhere herein, automatically detect inconsistencies that would otherwise be undetected, and/or otherwise automatically detect inconsistencies using the copied instance of the database engine.

Furthermore, systems and methods described herein have been described with respect to a query executed at different timestamps (e.g., timestamp t and timestamp t'); however, other factors may be used to distinguish between two executions of the same query. For example, executions of a query may be distinguished based on different user identifiers (IDs), different versions of database engine program code, and/or other information for distinguishing between two or more executions of a query.

Moreover, according to the described embodiments and techniques, any components of systems, database engines, correctness verifiers, user interfaces, and/or developer interfaces and their functions may be caused to be activated for operation/performance thereof based on other operations, functions, actions, and/or the like, including initialization, completion, and/or performance of the operations, functions, actions, and/or the like.

In some example embodiments, one or more of the operations of the flowcharts described herein may not be performed. Moreover, operations in addition to or in lieu of the operations of the flowcharts described herein may be performed. Further, in some example embodiments, one or more of the operations of the flowcharts described herein may be performed out of order, in an alternate sequence, or partially (or completely) concurrently with each other or with other operations.

The further example embodiments and advantages described in this Section may be applicable to any embodiments disclosed in this Section or in any other Section of this disclosure.

The embodiments described herein and/or any further systems, sub-systems, devices and/or components disclosed herein may be implemented in hardware (e.g., hardware logic/electrical circuitry), or any combination of hardware with software (computer program code configured to be executed in one or more processors or processing devices) and/or firmware.

VII. Example Computer System Implementations

System 100, user interface 102, database engine 104, correctness verifier 106, data stores 108, developer interface 110, query executor 112, signature generator 114, diagnostic component 116, signature receiver 118, match determiner 120, remediation component 122, database 124, key-value store 126, database engine program code 146, flowchart 200, flowchart 300, query analyzer 402, version selecting component 404, query execution engine 406, timestamp determiner 410, database selector 412, query logs 414, database versions 416, flowchart 500, signature analyzer 608, key-value store interface 610, report generator 612, remediator 614, and/or query keys 628 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 8:
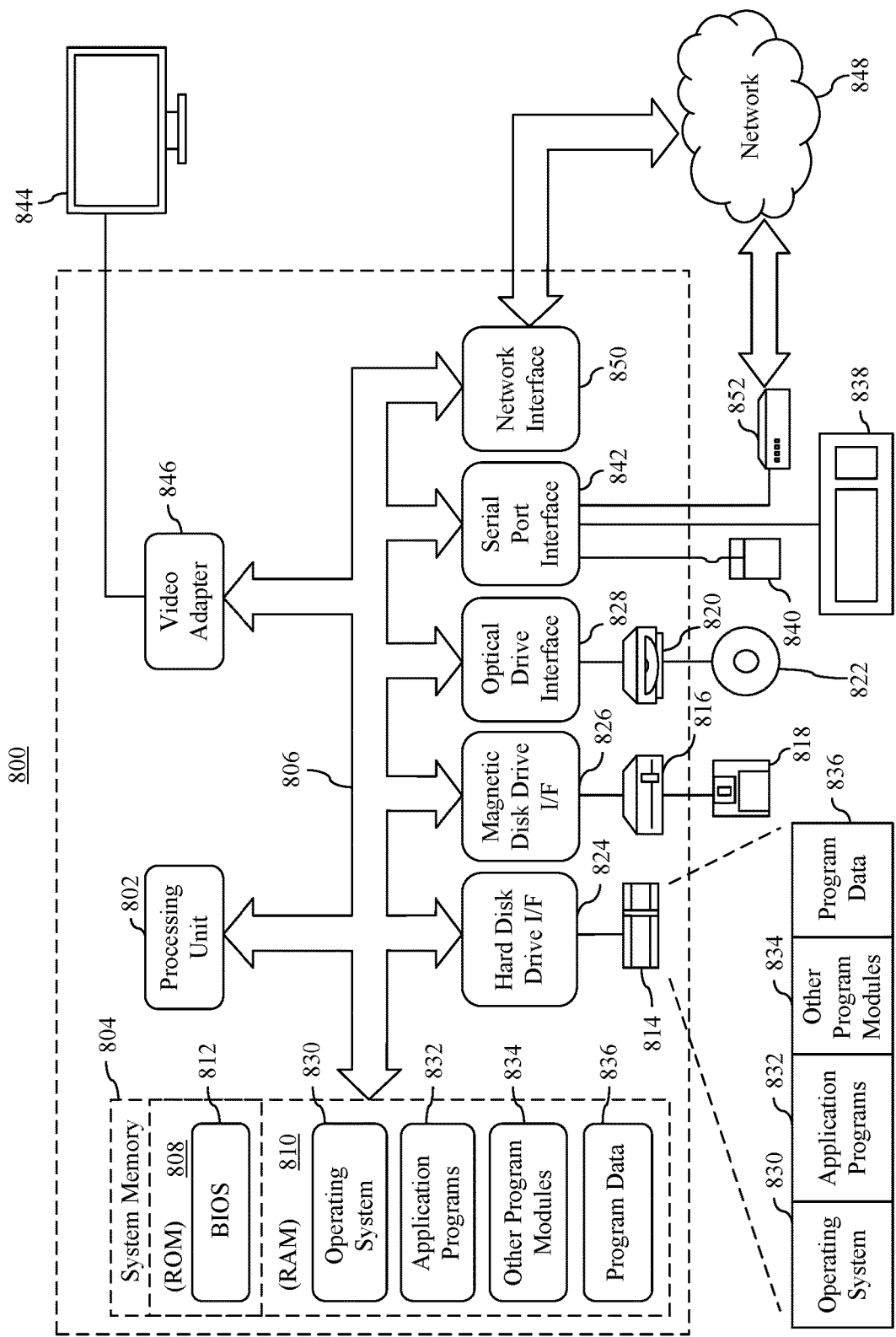
FIG. 8 is a block diagram of an example computer system that may be used to implement embodiments.

FIG. 8 depicts an exemplary implementation of a computer system 800 ("system 800" herein) in which embodiments may be implemented. For example, system 800 may be used to implement system 100, user interface 102, database engine 104, correctness verifier 106, data stores 108, developer interface 110, query executor 112, signature generator 114, diagnostic component 116, signature receiver 118, match determiner 120, remediation component 122, database 124, and/or key-value store 126, as described above in reference to FIG. 1. System 800 may also be used to implement query analyzer 402, version selecting component 404, query execution engine 406, timestamp determiner 410, database selector 412, query logs 414, database versions 416, as described above in reference to FIG. 4. System 800 may also be used to implement signature analyzer 608, key-value store interface 610, report generator 612, and/or remediator 614, as described above in reference to FIG. 6. System 800 may also be used to implement any of the steps of any of the flowcharts of FIGS. 2, 3, and/or 5, as described above. System 800 may also be used to implement any receiving, obtaining, executing, generating, determining, performing, remediations, transmitting, and/or the like associated with embodiments of FIGS. 7A and/or 7B. The description of system 800 provided herein is provided for purposes of illustration and is not intended to be limiting. Embodiments may be implemented in further types of computer systems, as would be known to persons skilled in the relevant art(s).

As shown in FIG. 8, system 800 includes one or more processors, referred to as processor unit 802, a system memory 804, and a bus 806 that couples various system components including system memory 804 to processor unit 802. Processor unit 802 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor unit 802 may execute program code stored in a computer readable medium, such as program code of operating system 830, application programs 832, other programs 834, etc. Bus 806 represents one or more of any of several types of bus structures, including a memory bus or memory controller, a peripheral bus, an accelerated graphics port, and a processor or local bus using any of a variety of bus architectures. System memory 804 includes read only memory (ROM) 808 and random-access memory (RAM) 810. A basic input/output system 812 (BIOS) is stored in ROM 808.

System 800 also has one or more of the following drives: a hard disk drive 814 for reading from and writing to a hard disk, a magnetic disk drive 816 for reading from or writing to a removable magnetic disk 818, and an optical disk drive 820 for reading from or writing to a removable optical disk 822 such as a CD ROM, DVD ROM, or other optical media. Hard disk drive 814, magnetic disk drive 816, and optical disk drive 820 are connected to bus 806 by a hard disk drive interface 824, a magnetic disk drive interface 826, and an optical drive interface 828, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards and drives (e.g., solid state drives (SSDs)), digital video disks, RAMs, ROMs, and other hardware storage media.

A number of program modules or components may be stored on the hard disk, magnetic disk, optical disk, ROM, or RAM. These program modules include an operating system 830, one or more application programs 832, other program modules 834, and program data 836. In accordance with various embodiments, the program modules may include computer program logic that is executable by processing unit 802 to perform any or all the functions and features of user interface 102, database engine 104, correctness verifier 106, data stores 108, developer interface 110, query executor 112, signature generator 114, diagnostic component 116, signature receiver 118, match determiner 120, remediation component 122, database 124, key-value store 126, database engine program code 146, flowchart 200, flowchart 300, query analyzer 402, version selecting component 404, query execution engine 406, timestamp determiner 410, database selector 412, query logs 414, database versions 416, flowchart 500, signature analyzer 608, key-value store interface 610, report generator 612, and/or remediator 614 (including any steps of flowcharts 200, 300, and/or 500).

A user may enter commands and information into the system 800 through input devices such as keyboard 838 and pointing device 840. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor unit 802 through a serial port interface 842 that is coupled to bus 806, but may be connected by other interfaces, such as a parallel port, game port, or a universal serial bus (USB).

A display screen 844 is also connected to bus 806 via an interface, such as a video adapter 846. Display screen 844 may be external to, or incorporated in, system 800. Display screen 844 may display information, as well as being a user interface for receiving user commands and/or other information (e.g., by touch, finger gestures, virtual keyboard, etc.). For example, display screen 844 may implement user interface 102 and/or developer interface 110 of FIG. 1 and be configured to display query 128, objects referred to by query 128, versions of database engine program code 146, subset of data 130, versions of database 124, result 132, first signature 134, second signature 136, failure message 142, and/or development message 144 of FIG. 1, query key 418, a timestamp corresponding to query key 418, query key 420, timestamp 422, and/or version 424 of FIG. 4, query key 616 and/or inconsistency report 620 of FIG. 6, query key 702A, department table 704, department location table 706, results 708A, and/or signature 710A of FIG. 7A, query key 702B, results 708B, and/or signature 708B of FIG. 7B, and/or other information associated with automatic detection of inconsistencies in database systems. In addition to display screen 844, system 800 may include other peripheral output devices (not shown) such as speakers and printers.

System 800 is connected to a network 848 (e.g., the Internet) through an adaptor or network interface 850, a modem 852, or other means for establishing communications over the network. Modem 852, which may be internal or external, may be connected to bus 806 via serial port interface 842, as shown in FIG. 8, or may be connected to bus 806 using another interface type, including a parallel interface.

As used herein, the terms "computer program medium," "computer-readable medium," and "computer-readable storage medium" are used to refer to physical hardware media such as the hard disk associated with hard disk drive 814, removable magnetic disk 818, removable optical disk 822, other physical hardware media such as RAMs, ROMs, flash memory cards, digital video disks, zip disks, MEMs, nano-technology-based storage devices, and further types of physical/tangible hardware storage media. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media that are separate and non-overlapping with embodiments directed to computer-readable storage media.

As noted above, computer programs and modules (including application programs 832 and other programs 834) may be stored on the hard disk, magnetic disk, optical disk, ROM, RAM, or other hardware storage medium. Such computer programs may also be received via network interface 850, serial port interface 842, or any other interface type. Such computer programs, when executed or loaded by an application, enable system 800 to implement features of embodiments described herein. Accordingly, such computer programs represent controllers of the system 800.

Embodiments are also directed to computer program products comprising computer code or instructions stored on any computer-readable medium. Such computer program products include hard disk drives, optical disk drives, memory device packages, portable memory sticks, memory cards, and other types of physical storage hardware. In accordance with various embodiments, the program modules may include computer program logic that is executable by processing unit 802 to perform any or all of the functions and features of user interface 102, database engine 104, correctness verifier 106, developer interface 110, query executor 112, signature generator 114, diagnostic component 116, signature receiver 118, match determiner 120, and/or remediation component 122 as described above in reference to FIG. 1, query analyzer 402, version selecting component 404, query execution engine 406, timestamp determiner 410, and/or database selector 412 as described above in reference to FIG. 4, and/or signature analyzer 608, key-value store interface 610, report generator 612, and/or remediator 614 as described above in reference to FIG. 6. The program modules may also include computer program logic that, when executed by processing unit 802, causes processing unit 802 to perform any of the steps of any of the flowcharts of FIGS. 2, 3 and/or 5, as described above. The program modules may also include computer program logic that, when executed by processing unit 802, causes processing unit 802 to perform any of the various receiving, obtaining, executing, generating, determining, performing, remediations, transmitting, and/or the like associated with embodiments of FIGS. 7A and/or 7B, as described above.

VIII. Additional Exemplary Embodiments

In an embodiment, a database system includes a processor and at least one memory device. The at least one memory device stores system program code to be executed by the processor. The system program code includes a correctness verifier. The correctness verifier is configured to receive a first signature and a second signature. The first signature is a signature of a result of a first execution of a query against a database by a first version of database engine program code. The second signature is a signature of a result of a second execution of the query by a second version of the database engine program code. The correctness verifier is further configured to determine whether the first signature and the second signature match. In response to the first signature and the second signature failing to match, the correctness verifier is configured to generate an inconsistency report regarding at least one of the first or second versions of the database engine program code, and perform remediation regarding at least one of the first or second versions of the database engine program code.

In an embodiment, the correctness verifier is further configured to receive a query key corresponding to the first execution of the query and access a data store that stores a set of query keys and respective signatures. Each query key of the set of query keys corresponds to an execution of the query at a respective timestamp. The correctness verifier is configured to access the second signature in the data store by matching the query key corresponding to the first execution of the query against the set of query keys to identify a query key corresponding to the second execution of the query.

In an embodiment, each query key of the set of query keys is a tuple of a query text hash corresponding to the execution of the query at the respective timestamp and a joined hash of versions of objects used in the execution of the query at the respective timestamp.

In an embodiment, the first signature is a checksum of the result of the first execution of the query or a count of rows of the result of the first execution of the query.

In an embodiment, to perform remediation regarding at least one of the first or second versions of the database engine program code, the correctness verifier is configured to transmit a failure message to a user interface, transmit the inconsistency report to a developer interface, or transmit a signal to a database engine to cause the database engine to capture a process image of the current state of the database engine.

In an embodiment, the first version of the database engine program code and the second version of the database engine program code are a same version of the database engine program code. The correctness verifier is configured to perform an assessment of the same version of the database engine program code for an incorrect, non-deterministic issue as at least a portion of the performed remediation.

In an embodiment, the database system includes a signature generator. The signature generator is configured to generate the first signature as a checksum of the result of the first execution of the query using a per-row hash function.

In an embodiment, the database system includes a database engine. The database engine is configured to receive the query and access a timestamp of the second execution of the query in a data store. The database engine is configured to select a version of the database with a timestamp matching the timestamp of the second execution of the query. The database engine is configured to execute the query against the selected version of the database by the first version of the database engine program code to generate the result of the first execution of the query. The database engine is configured to generate the first signature based on the result of the first execution of the query.

In an embodiment, a method for automatically detecting inconsistencies in a database system is performed. The method includes receiving a first signature and a second signature. The first signature is a signature of a result of a first execution of the query against a database by a first version of database engine program code. The second signature is a signature of a result of a second execution of the query by a second version of the database engine program code. A determination of whether the first signature and the second signature match is made. In response to the first signature and the second signature failing to match, an inconsistency report regarding at least one of the first or second versions of the database engine program code is generated, and remediation regarding at least one of the first or second versions of the database engine program code is performed.

In an embodiment, the method further includes a query key corresponding to the first execution of the query is received. A data store that stores a set of query keys and respective signatures is accessed. Each query key of the set of query keys corresponds to an execution of the query at a respective timestamp. The data store is accessed by matching the query key corresponding to the first execution of the query against the set of query keys to identify a query key corresponding to the second execution of the query. The second signature is obtained based on the identified query key corresponding to the second execution of the query.

In an embodiment, each query key of the set of query keys is a tuple of a query text hash corresponding to the execution of the query at the respective timestamp and a joined hash of versions of objects used in the execution of the query at the respective timestamp.

In an embodiment, the first signature is a checksum of the result of the first execution of the query or a count of rows of the result of the first execution of the query.

In an embodiment, the remediation regarding at least one of the first or second versions of the database engine program code is performed by transmitting a failure message to a user interface, transmitting the inconsistency report to a developer interface, or transmitting a signal to a database engine to cause the database engine to capture a process image of the current state of the database engine.

In an embodiment, the first signature is generated as a checksum of the result of the first execution of the query using a per-row hash function.

In an embodiment, the first version of the database engine program code and the second version of the database engine program code are a same version of the database engine program code. The remediation regarding at least one of the first or second versions of the database engine program code includes performing an assessment of the same version of the database engine program code for an incorrect, non-deterministic issue.

In an embodiment, the query is received. A timestamp of the second execution of the query is accessed in a data store. A version of the database with a timestamp matching the timestamp of the second execution of the query is selected. The query is executed against the selected version of the database by the first version of the database engine program code to generate the result of the first execution of the query. The first signature is generated based on the result of the first execution of the query.

In an embodiment, a correctness verifier includes a processor and at least one memory device. The at least one memory device stores correctness verifier program code to be executed by the processor. The processor executes the correctness verifier program code to receive a first signature and a second signature. The first signature is a signature of a result of a first execution of a query against a database by a first version of database engine program code. The second signature is a signature of a result of a second execution of the query by a second version of the database engine program code. The processor further executes the correctness verifier program code to determine whether the first signature and the second signature match. In response to the first signature and the second signature failing to match, the processor executes the correctness verifier program code to generate an inconsistency report regarding at least one of the first or second versions of the database engine program code, and perform remediation regarding at least one of the first or second versions of the database engine program code.

In an embodiment, the correctness verifier is further configured to receive a query key corresponding to the first execution of the query. The correctness verifier is configured to access a data store that stores a set of query keys and respective signatures. Each query key of the set of query keys corresponds to an execution of the query at a respective timestamp. The correctness verifier is configured to access the second signature in the data store by matching the query key corresponding to the first execution of the query against the set of query keys to identify a query key corresponding to the second execution of the query.

In an embodiment, each query key of the set of query keys is a tuple of a query text hash corresponding to the execution of the query at the respective timestamp and a joined hash of versions of objects used in the execution of the query at the respective timestamp.

In an embodiment, the first signature is a checksum of the result of the first execution of the query or a count of rows of the result of the first execution of the query.

In an embodiment, to perform remediation regarding at least one of the first or second versions of the database engine program code, the correctness verifier is configured to transmit a failure message to a user interface, transmit the inconsistency report to a developer interface, or transmit a signal to a database engine to cause the database engine to capture a process image of the current state of the database engine.

In an embodiment, the first signature is a checksum calculated by executing a per-row hash function against the result of the first execution of the query.

IX. Conclusion

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:

1. A database system comprising:
a processor, and
a memory device that stores system program code, the system program code executable by the processor to:
causing generation of a first signature corresponding to a first query key, the first query key corresponding to a first execution of a query against a database by a first version of database engine program code, the first signature a signature of a result of the first execution of the query, a size of the first signature smaller than a size of the result of the first execution of the query;
receive a second query key corresponding to a second execution of the query against the database by a second version of the database engine program code;

match the second query key against a set of query keys stored in a data store to identify the first query key, each query key of the set of query keys corresponding to respective execution of the query;

in response to identifying the first query key, obtain the first signature; and in response to detection of an inconsistency in the database based on the first signature, perform remediation regarding at least one of the first or second versions of the database engine program code.

2. The database system of claim 1, wherein to receive a second query key, the program code is executable by the processor circuit to:

receive a second signature, the second signature a signature of a result of the second execution of the query; and analyze the second signature to identify the second query key.

3. The database system of claim 2, wherein the second query key is stored as a key in the data store and the second signature is stored as a value in the data store.

4. The database system of claim 1, wherein the first query key of the set of query keys is a tuple of a query text hash corresponding to the first execution of the query at a timestamp and a joined hash of versions of objects used in the first execution of the query at the timestamp.

5. The database system of claim 1, wherein the first signature is a checksum of the result of the first execution of the query.

6. The database system of claim 1, wherein to perform remediation regarding at least one of the first or second versions of the database engine program code, the program code is executable by the processor to:

transmit a failure message to a user interface;

transmit an inconsistency report to a developer interface; or transmit a signal to a database engine to cause the database engine to capture a process image of the current state of the database engine.

7. The database system of claim 1, wherein the first version of the database engine program code and the second version of the database engine program code are a same version of the database engine program code, and the program code is executable by the processor to perform an assessment of the same version of the database engine program code for an incorrect, non-deterministic issue as a portion of the performed remediation.

8. The database system of claim 1, wherein the program code is executable by the processor to determine a mismatch between the first signature and the second signature to detect an inconsistency in the database based on the first signature.

9. A method for automatically detecting inconsistencies in a database system comprising:

receiving a second query key corresponding to a second execution of a query against a database by a second version of database engine program code;

matching the second query key against a set of query keys stored in a data store to identify a first query key, each query key of the set of query keys corresponding to respective execution of the query, the first query key corresponding to a first execution of the query against the database by a first version of the database engine program code;

obtaining a first signature corresponding to the first query key, the first signature a signature of a result of the first execution of the query, storage of the first signature consuming less memory for storage thereof than the result of the first execution of the query;

detecting an inconsistency in the database based on the first signature; and in response to detecting the inconsistency in the database based on the first signature, performing remediation regarding at least one of the first or second versions of the database engine program code.

10. The method of claim 9, wherein said receiving a second query key comprises:

receiving a second signature, the second signature a signature of a result of the second execution of the query; and analyzing the second signature to identify the second query key.

11. The method of claim 10, further comprising:

storing the second query key as a key and the second signature as a value in the data store.

12. The method of claim 9, wherein the first query key of the set of query keys is a tuple of a query text hash corresponding to the first execution of the query at a timestamp and a joined hash of versions of objects used in the first execution of the query at the timestamp.

13. The method of claim 9, wherein the first signature is a checksum of the result of the first execution of the query.

14. The method of claim 9, wherein said performing remediation regarding at least one of the first or second versions of the database engine program code comprises:

transmitting a failure message to a user interface;

transmitting an inconsistency report to a developer interface; or transmitting a signal to a database engine to cause the database engine to capture a process image of the current state of the database engine.

15. The method of claim 9, wherein the first version of the database engine program code and the second version of the database engine program code are a same version of the database engine program code, and said performing remediation comprises:

performing an assessment of the same version of the database engine program code for an incorrect, non-deterministic issue.

16. The method of claim 9, wherein the method further comprises:

determining a mismatch between the first signature and the second signature to detect an inconsistency in the database based on the first signature.

17. A computer-readable storage medium encoded with program instructions that, when executed by a processor circuit, performs a method comprising:

receiving a second query key corresponding to a second execution of a query against a database by a second version of database engine program code;

matching the second query key against a set of query keys stored in a data store to identify a first query key, each query key of the set of query keys corresponding to respective execution of the query, the first query key corresponding to a first execution of the query against the database by a first version of the database engine program code;

obtaining a first signature corresponding to the first query key, the first signature a signature of a result of the first execution of the query, storage of the first signature consuming less memory for storage thereof than the result of the first execution of the query;

detecting an inconsistency in the database based on the first signature; and in response to detecting the inconsistency in the database based on the first signature, performing remediation regarding at least one of the first or second versions of the database engine program code.

18. The computer-readable storage medium of claim 17, wherein said receiving a second query key comprises:
receiving a second signature, the second signature a signature of a result of the second execution of the query; and
analyzing the second signature to identify the second query key.

19. The computer-readable storage medium of claim 18, wherein the method further comprises:
storing the second query key as a key and the second signature as a value in the data store.

20. The computer-readable storage medium of claim 19, wherein the method further comprises:
determining a mismatch between the first signature and the second signature to detect an inconsistency in the database based on the first signature.

* * * * *